Sept. 10, 1968 F. R. SHIPPEY 3,400,825
DESALINATION CELL WITH OSMOTIC MEMBRANE ELEMENT
Filed Aug. 22, 1966 2 Sheets-Sheet 1

*INVENTOR.*
FRANK R. SHIPPEY
BY Knox & Knox

Sept. 10, 1968  F. R. SHIPPEY  3,400,825
DESALINATION CELL WITH OSMOTIC MEMBRANE ELEMENT
Filed Aug. 22, 1966  2 Sheets-Sheet 2
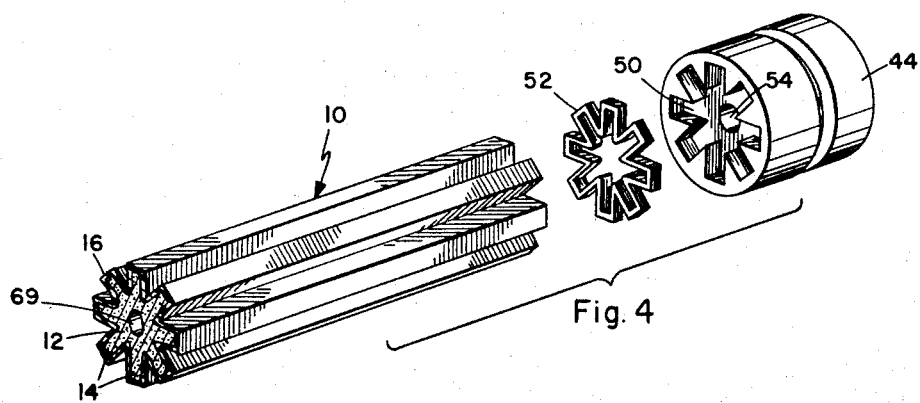
Fig. 4
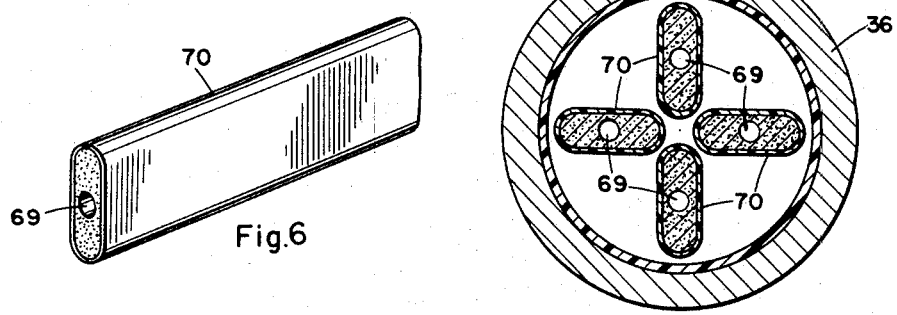
Fig. 6
Fig. 5
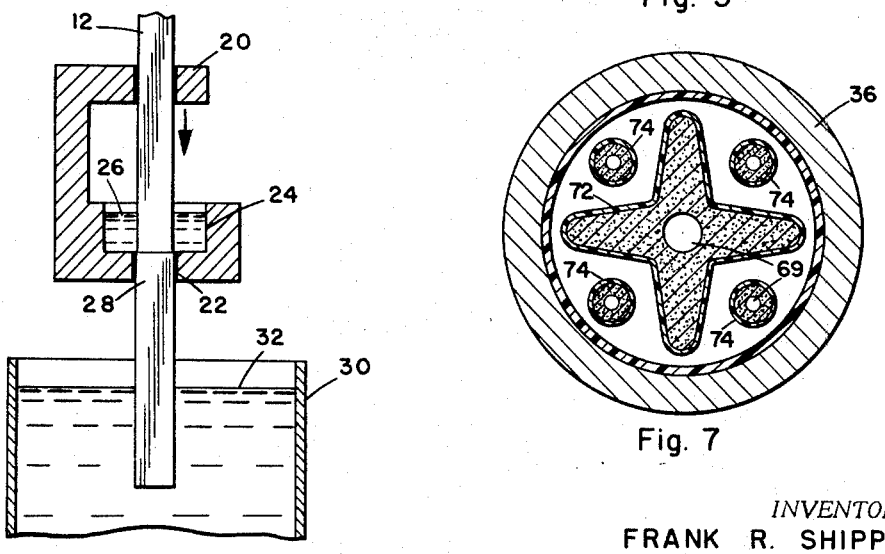
Fig. 8
Fig. 7
INVENTOR.
FRANK R. SHIPPEY
BY Knox & Knox

# United States Patent Office 3,400,825
Patented Sept. 10, 1968

3,400,825
DESALINATION CELL WITH OSMOTIC
MEMBRANE ELEMENT
Frank R. Shippey, 760 B Ave.,
Coronado, Calif. 92118
Filed Aug. 22, 1966, Ser. No. 573,897
6 Claims. (Cl. 210—321)

ABSTRACT OF THE DISCLOSURE

The desalination cell utilizes a rigid porous core or cores having cross sections shaped to provide large surface areas, the cores being covered by a semipermeable membrane except at certain portions of the ends. Each core or group of cores is mounted in a vessel very little larger than the cores themselves, with combined clamping and sealing means holding the cores at the ends under longitudinal compression. The pure water content of pressurized water in the vessel passes through the membrane and through the porous cores to collecting means and outlets incorporated in the clamping and sealing means at both ends.

---

The present invention relates to desalination of water and specifically to a desalination cell with an osmotic membrane element which is self-supporting under high operating pressure.

In the desalination of salt water by the reverse osmosis technique, saline solution is applied under pressure to one side of a semipermeable membrane which permits the passage of water but prevents the passage of salt. When the supply pressure of the saline solution exceeds the osmotic pressure, or the hydrostatic pressure at which the osmotic flow between the saline solution and pure water is at equilibrium, pure water will pass through the membrane and can be collected. The remaining saline solution is then discarded, or used in any required manner. The basic principles of the process are well known and various types of membranes have been developed. The membranes as used are normally only a few thousandths of an inch in thickness and ultra-thin membranes have been developed, so they must be suitably supported in order to withstand the pressure of the saline solution. Obviously the rate of flow is proportional to the area of membrane and the effective support of large membranes has presented some problems. One type of desalination unit uses flat porous plates with membranes applied to one side of each plate, but these are limited in size due to the difficulty in supporting the plates against the pressure, which may be on the order of 600–1500 pounds per square inch. Another type uses a sheet-like porous element carrying the membrane and rolled into a spiral, the pure water being collected from the inner edge of the porous element. A further type involves a porous walled tube with the membrane on the inner surface. Each of these types must be contained in a pressure vessel, which is large compared to the useful area of membrane provided, and replacement of the membrane requires considerable effort and disassembly of the apparatus.

In the desalination cell described herein the membrane is carried on a porous core or cores, each of which is an elongated rigid element having a cross section designed to present a maximum area of membrane. Each membrane element or group of elements is clamped under longitudinal compression in a pressure vessel very little larger than the membrane element cross section and pure water can be collected from both ends. The longitudinal compression makes the membrane elements resistant to distortion and also ensures good sealing at the ends, while the clamping arrangement makes it very simple to replace elements when necessary.

A typical cell and various membrane element arrangements are illustrated in the drawings, in which:

FIGURE 4 is an exploded perspective view of one end of a membrane element and its retaining fittings;

FIGURE 5 is a sectional view, similar to FIGURE 3, showing a multiple membrane element arrangement;

FIGURE 6 is a perspective view of a portion of one of the membrane elements used in FIGURE 5;

FIGURE 7 is a sectional view showing a further multiple membrane element arrangement; and FIGURE 8 is a diagram showing one method of casting a membrane on the core member.

Similar characters of reference indicate similar or identical elements and portions throughout the specification and throughout the views of the drawings.

Figure 1:
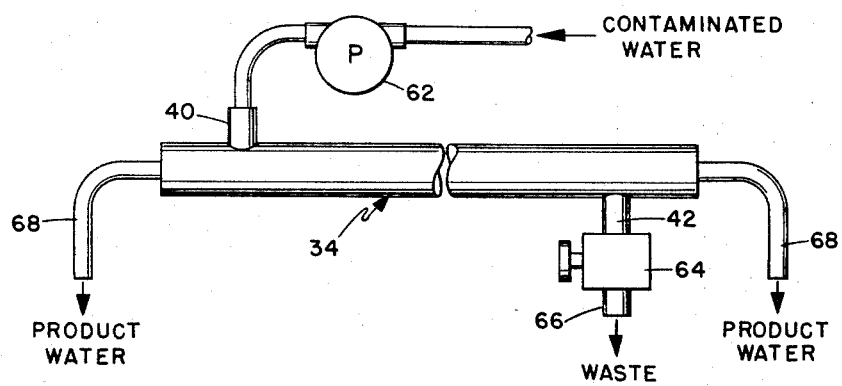
FIGURE 1 is a diagram of a typical desalination system.
Figure 2:
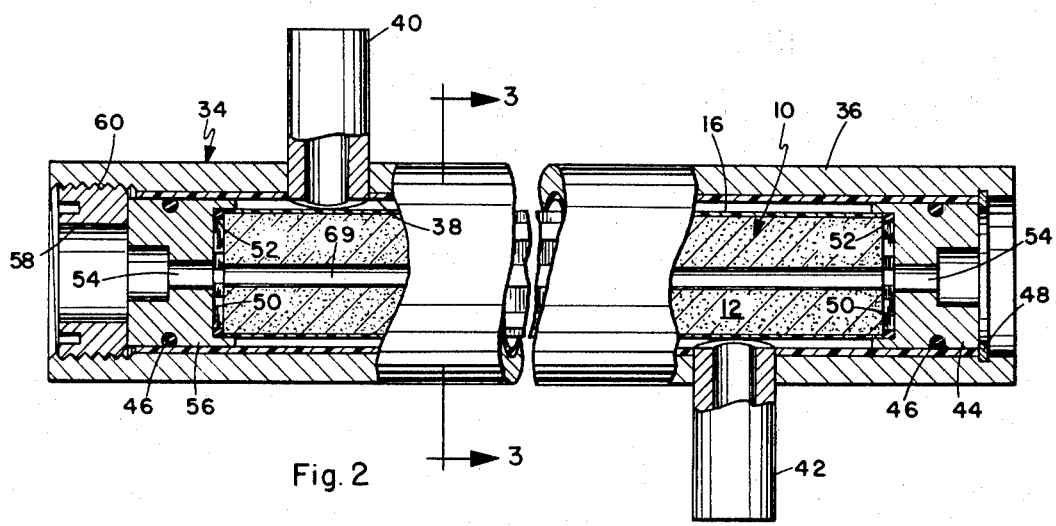
FIGURE 2 is a side elevation view, partially sectioned, of the desalination cell used in FIGURE 1.
Figure 3:
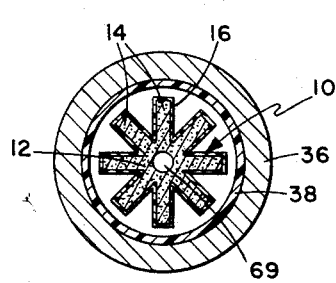
FIGURE 3 is a sectional view taken on line 3—3 of FIGURE 2.

The membrane element 10 comprises an elongated rigid core 12 of porous metal, ceramic, or other material capable of withstanding the required working pressure without deterioration of the porosity and is illustrated as having a plurality of radial vanes 14 to provide a large surface area. A membrane 16 is deposited on all longitudinal outer surfaces of core 12 in the form of a thin unbroken coating, the end faces being left uncoated. While various methods may be used to apply the membrane to the core, one suitable method is shown in FIGURE 8. The core 12 is lowered through a guide 20 and through a shaped die 22, above which is a cup 24 containing the membrane material as a fluid 26. Die 22 is shaped to conform to the cross sectional shape of the core 12 and is very slightly larger than the core, so that a thin film 28 of fluid 26 will be carried on the core as it passes through the die. The coating end of the core is lowered into a cooling tank 30 containing cold water 32, or the like, which sets the fluid into a film or membrane. Subsequent heat treatment or curing processing will depend on the particular membrane material.

Although it is not desired to be limited to a specific membrane material, a particularly suitable type is described in detail in Report No. 65–13 of the Department of Engineering of the University of California, Los Angeles. The membrane material is a fluid composed of cellulose acetate dissolved in a mixture of acetone and formamide in the proportions of cellulose acetate 20–30%, acetone 35–65% and formamide 10–40%. This material is readily coated or cast onto cores of any reasonable configuration. Other compositions may be used, depending on flow rates and operating conditions.

The cell 34 is basically an elongated cylindrical pressure vessel 36 somewhat longer than the membrane element, and may be of steel with a plastic liner 38, or some similar construction resistant to corrosion and pressure. Pressure vessel 36 has an inlet 40 and an outlet 42, preferably at opposite ends for maximum water circulation. In one end of the pressure vessel is a retaining plug 44 sealed by an annular O-ring 46 and held in place by a lock ring 48. The inner face of retaining plug 44 has a socket 50 corresponding closely to the cross sectional shape of the membrane element 10, an end of which seats in the socket. A peripheral gasket 52 is used between the membrane element and the socket face to seal only the peripheral edge and leave the major portion of the porous end face of the core exposed. An outlet port 54 extends from socket 50 through the retaining plug for extraction of pure water exuding from the core 12.

In the other end of pressure vessel 36 is a clamp plug 56, similar in all respects to the retaining plug 44 and holding the other end of the membrane element 10. A threaded clamp collar 58 is screwed into the threaded end 60 of pressure vessel 36 and tightened to apply longitudinal compression to the membrane element.

In operation, contaminated water or saline solution is supplied to inlet 40 under pressure from a pump 62. A pressure control valve 64 connected to outlet 42 limits the outflow through drain 66 and maintains the required pressure in the pressure vessel 36. Pure water will permeate the membrane and flow through the porous core to the ends, from which the product water is collected by pipes 68 connected to outlet ports 54. The term "pure water" is used to distinguish the product from the waste saline solution, the actual purity depending on the efficiency of the membrane, the flow rate and other operating conditions. By collecting the product from both ends the flow of product water through the core is improved and the membrane element may be of considerable length. To further improve flow through the porous material the core 12 may be provided with a longitudinal bore hole 69 substantially at the axis, which acts as a collecting channel to carry water to the ends of the element and thus reduces hydraulic friction.

Various cross sectional configurations may be used for the membrane element and several elements may be contained in a single cell. One example, illustrated in FIGURES 5 and 6, utilizes four flat bar type membrane elements 70 arranged in a radiating pattern for maximum water circulation.

A further example, shown in FIGURE 7, uses a large star sectioned membrane element 72 with cylindrical rod elements 74 extending between the vanes of the star to add to the useful membrane area. Many other different arrangements and combinations can be used and bore holes 69 can be included in any or part of the elements.

In each instance the end plugs of the pressure vessel would have sockets shaped to hold the particular membrane element or group of elements. Longitudinal compression seals and supports the membrane elements rigidly. The use of the readily removable clamp plug 56 facilitates the removal of the membrane elements for inspection or replacement, without having to dismantle large portions of the apparatus.

It should be noted that when the working pressure is relieved, or reduced below the osmotic equilibrium pressure, the water in the porous core will tend to permeate the membrane by the normal process of osmosis and return to the saline solution. This reversed flow has a cleaning effect on the membrane and may be useful in prolonging its effective life. A further useful feature of the particular membrane element structure is related to the requirement that the membrane must be kept moist, even during storage or shipping, in order to retain its semipermeable characteristics. The porous core can be saturated with water and the element enclosed in a water filled container, such as a plastic bag, so that the membrane is kept moist on both sides.

While the apparatus is described as being used for desalination, it will be obvious that brackish water or otherwise contaminated water, or even other liquids could be treated by using an appropriate membrane employed according to this invention.

It is understood that minor variation from the form of the invention disclosed herein may be made without departure from the spirit and scope of the invention, and that the specification and drawings are to be considered as merely illustrative rather than limiting.

I claim:
1. A desalination cell, comprising:
   a pressure vessel having inlet means for connection to a pressurized source of saline water;
   a membrane element having an elongated rigid core of porous material, with a semipermeable membrane, substantially covering the core excepting end portions of the core;
   support elements in said pressure vessel engaging the ends of the membrane and supporting the membrane element in spaced relation within said vessel and gaskets sealing the said end portions of the membrane element, around the outer periphery of said membrane element end portions, to said support elements;
   outlet means communicating with at least one of said end portions of the core for extraction of desalinated water; and
   outlet means in said vessel spaced from said inlet means to assure circulation of the saline water around said membrane element.
2. The apparatus according to claim 1, wherein said pressure vessel is an elongated cylinder in closely spaced relation around said membrane element.
3. The apparatus according to claim 1, wherein said support means includes plug members at opposite ends of said pressure vessel, and adjustable clamp means engaging at least one of said plugs for applying longitudinal compression to the membrane element held between the plugs.
4. The apparatus according to claim 3, wherein each of said plugs has a socket conforming closely to the cross sectional shape of said membrane element and in which an end of the membrane element is seated in sealed connection.
5. The apparatus according to claim 4 and including outlets in both of said plugs communicating with said sockets for extraction of desalinated water from both ends.
6. The apparatus according to claim 1, wherein said pressure vessel is an elongated cylinder fitting in closely spaced relation around said membrane element;
   said support means including a retaining plug fixed in one end of said pressure vessel, and a clamp plug adjustably slidable in the other end thereof, each of said plugs having a socket closely conforming to the cross sectional shape of said membrane element to receive an end of the element in sealed connection;
   clamp means engaging said clamp plug and being adjustable to exert longitudinal compression on the membrane element;
   and outlets in said plugs communicating with said sockets for extraction of desalinated water therefrom.

References Cited

UNITED STATES PATENTS

| 655,841 | 8/1900 | Watson et al. | 210—433 X |
| 661,373 | 11/1900 | Jandus | 210—451 X |
| 2,022,164 | 11/1935 | Sweetland | 210—450 X |
| 2,661,095 | 12/1953 | Koth | 210—433 |
| 3,156,645 | 11/1964 | Chapin et al. | 210—321 X |
| 3,240,342 | 3/1966 | Callahan et al. | 210—451 X |

FOREIGN PATENTS

| 1,382 | 12/1853 | Great Britain. |
| 705,608 | 3/1931 | France. |

REUBEN FRIEDMAN, *Primary Examiner.*

F. SPEAR, *Assistant Examiner.*